United States Patent
Grossman et al.

(10) Patent No.: US 6,323,486 B1
(45) Date of Patent: Nov. 27, 2001

(54) METHOD AND APPARATUS FOR BIAS AND READOUT OF BOLOMETERS OPERATED ON A HYSTERETIC METAL-INSULATOR TRANSITION

(75) Inventors: Erich N. Grossman, Boulder; Carl D. Reintsema, Nederland, both of CO (US)

(73) Assignee: The United States of America as represented by the Secretary of Commerce, Washington, DC (US)

(*) Notice: Subject to any disclaimer, the term of this patent is extended or adjusted under 35 U.S.C. 154(b) by 0 days.

(21) Appl. No.: 09/365,113

(22) Filed: Jul. 30, 1999

Related U.S. Application Data (60) Provisional application No. 60/094,845, filed on Jul. 31, 1998.

(51) Int. Cl.⁷ ............................. H01L 31/08; H01L 31/02
(52) U.S. Cl. ...................... 250/338; 250/352; 250/339.03
(58) Field of Search ............................. 250/338.1, 338.4, 250/339.03, 341.1, 338.3, 352

(56) References Cited

U.S. PATENT DOCUMENTS

| | | | |
|---|---|---|---|
| Re. 36,615 | * | 3/2000 | Wood ..................................... 338/18 |
| 4,370,640 | * | 1/1983 | Dynes et al. ............................ 338/25 |

(List continued on next page.)

FOREIGN PATENT DOCUMENTS

| | | | |
|---|---|---|---|
| 198 61 126-A1 | * | 4/2000 | (DE) .............................. G01D/21/00 |
| 2000-55737-A | * | 2/2000 | (JP) .................................. G01J/5/02 |

OTHER PUBLICATIONS

DeNatale, J.F. et al., "Formation and characterization of grain–oriented $VO_2$ thin films," (1989) *J. Appl. Phys.* 66(12):5844–5850.

(List continued on next page.)

*Primary Examiner*—Constantine Hannaher
*Assistant Examiner*—Albert Gagliardi
(74) *Attorney, Agent, or Firm*—Greenlee, Winner and Sullivan, P.C.

(57) ABSTRACT

This invention consists of a bias and readout scheme for resistive bolometers. It is chiefly intended for use with bolometer materials which exhibit a phase transition that is hysteretic. A preferred bolometer material is vanadium dioxide, which has a metal-semiconductor phase transition at 68° C. and a hysteresis of typically 5° C., depending on material preparation. The existence of hysteresis precludes the use of a conventional dc bias or a conventional pulsed bias in a bolometer operated on the phase transition. In the present method, the bias consists of an ac current for phase transitions in which the resistance decreases with increasing temperature. For phase transitions in which the resistance increases with temperature, an ac voltage bias would be used.) The waveform of the ac bias consists of a short "reset" segment in which the peak current is high enough to bring the bolometer completely into its metallic state, followed by a longer "data" segment in which the bias current and bias power monotonically decrease, so as to sweep the bolometer's physical temperature downward across the phase transition. The frequency of the ac bias is determined by the condition that the slew rate in bias power during the data segment must always exceed the slew rate in signal power, for all signals of interest. The signal is read out by averaging the bolometer voltage over a time window lying entirely within the data segment. With this bias and readout scheme, the full slope of the bolometer R(T) characteristic is reflected in the output from small signals, which would not be the case for a conventional dc or pulsed bias scheme. Since the full slope of the R(T) characteristic is accessible, the bolometer can operate in the extreme electrothermal feedback regime, which provides major improvements in speed, 1/f-noise, and sensitivity.

20 Claims, 8 Drawing Sheets

U.S. PATENT DOCUMENTS

| | | | |
|---|---|---|---|
| 5,386,120 | * | 1/1995 | Micheli et al. .................... 250/338.2 |
| 5,450,053 | | 9/1995 | Wood . |
| 5,608,568 | * | 3/1997 | Blodgett et al. ...................... 359/288 |
| 5,801,383 | * | 9/1998 | Wada et al. .......................... 250/332 |
| 5,900,799 | * | 5/1999 | Morris .................................... 338/18 |
| 6,121,618 | * | 9/2000 | Morris ................................. 250/352 |

OTHER PUBLICATIONS

Griffiths, C.H. and Eastwood, H.K., "Influence of stoichiometry on the metal–semiconductor transition in vanadium dioxide," (1974) *J. Appl. Phys.* 45(5):2201–2206.

Irwin, K.D. et al., "Thermal–response Time of Superconducting Transition–edge Microcalorimeters," (1998) *J. Appl. Phys.* 83(8):3978–3985.

Irwin, K.D., "Phonon–Mediated Particle Detection Using Superconducting Tungsten Transition–edge Sensors," (1995), Ph.D. dissertation, Palo Alto, CA; Stanford Univ. Abstract only.

Jerominek, H. et al., "Micromachined, Uncooled, $VO_2$–based, IR Bolometer Arrays," (1996) *Proc. of SPIE* 2746:60–71.

Jerominek, H. et al., "Vanadium Oxide Films for Optical Switching and Detection," (1993) *Optical Eng.* 32(9):2092–2099.

Kim, D.H. and Kowk, H.S., "Pulsed Laser Deposition of $VO_2$ Thin Films," (1994) *Appl. Phys. Lett.*, 65(25):3188–3190.

Lee, A.T. et al., "A Superconducting Bolometer with Strong Electrothermal Feedback," (1996) *Appl. Phys. Lett.* 69(12):1801–1803.

Morin, F.J., "Oxides which show a metal–to–insulator transition at the Neel temperature," (1959) *Phys. Rev. Lett.* 3(1):34–36.

Rogers, K.D. et al., "Characterization of epitaxially grown films of vanadium oxides," (1991) *J. Appl. Phys.* 70(3):1412–1415.

Scott, R.S. and Fredericks, G.E., "Model for Infrared Detection by a Metal–Semiconductor Phase Transition," (1976) *Infrared Physics* 16:619–626.

Wood, R.A., "Monolithic Silicon Microbolometer Arrays," (1997) *Semiconductors and Semimetals* 47:43–121.

* cited by examiner

METHOD AND APPARATUS FOR BIAS AND READOUT OF BOLOMETERS OPERATED ON A HYSTERETIC METAL-INSULATOR TRANSITION

CROSS-REFERENCE TO RELATED APPLICATIONS

This application claims priority from U.S. Provisional application No. 60/094,845 filed Jul. 31, 1998.

BACKGROUND

Prior work on cryogenic resistive bolometers [Irwin, 1998, Irwin, 1995, Lee, 1996] has shown that greatly improved performance is attainable from bolometers which possess a sharp transition between two phases with widely differing resistivity, specifically the superconducting (zero dc resistance) state and the normal metallic state. With a properly chosen bias circuit and bias point, these superconducting transition-edge bolometers will operate in a regime of strong electrothermal feedback, exhibiting higher bandwidth, lower 1/f resistance noise, and greater immunity from operating temperature fluctuations. The magnitude of these improvements is determined by the sharpness of the resistive transition (which can be precisely quantified, see below).

It would be highly desirable to achieve these performance advantages in bolometers which operated near room temperature, eliminating the need for cryogenic cooling. However, no materials are known which possess a resistive transition near room temperature that is analogous to the superconducting transition. Therefore, current room-temperature bolometers [Wood, 1997] operate on resistivity-temperature characteristics that are quite gentle, typically exhibiting temperature coefficients of resistivity (TCR) characteristic of a normal semiconductor, i.e., 1–4%/K, rather than on a sharp transition. With such low TCR values, the performance advantages due to electrothermal feedback are insignificantly small. Large arrays of these uncooled microbolometers form the core of many IR camera systems.

The cameras which are being produced today offer impressive performance: net equivalent temperature differences (NETD) as low as 24 mK between adjacent pixels and formats up to 320×240 pixels translate directly to unprecedented thermal scene resolution at video frame rates. The best of these systems rely on the temperature dependent resistivity of mixed vanadium oxides in a semiconducting amorphous form, operating at room temperature, as the bolometric sensing mechanism. The key technical breakthroughs which have enabled the technology to reach its current state include engineering of free-standing low-thermal-conductivity membranes (onto which the vanadium oxide is deposited to form a bolometric pixel element), the scale up of this technology to high-fill-factor large-format arrays, and the integration of direct CMOS read out electronics underneath each pixel.

Figure 1:
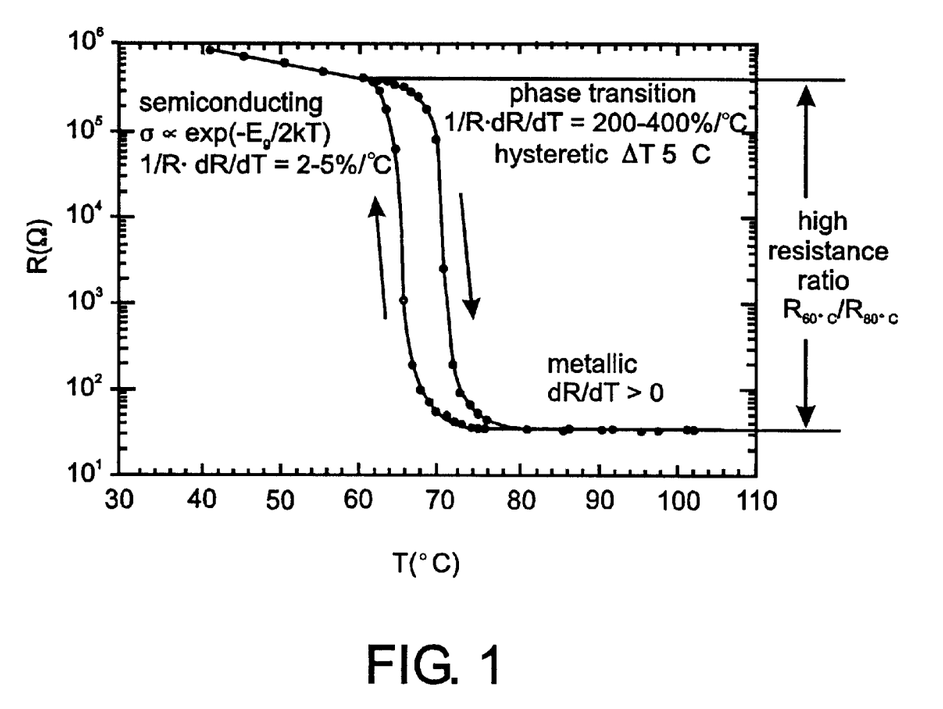
FIG. 1 shows typical resistance as a function of temperature R(T) for a high-quality thin film of vanadium dioxide, showing the hysteresis associated with the metal-semiconductor transition.

It is widely understood that in order to achieve high performance in a microbolometer sensor, it is necessary to use a material with a high TCR, and that the metal-semiconductor phase transition provides very large TCR values--some two orders of magnitude larger than the semiconducting bolometer materials conventionally used (see FIG. 1). The idea of operating an uncooled bolometer on the metal-semiconductor transition has been suggested before in the open literature [Scott, 1976, Wood, 1997, Jerominek, 1996], and mentioned as an alternative embodiment in a prior U.S. patent [Wood, 1995]. However, all measurements of the metal-semiconductor phase transition, whether in vanadium dioxide [Jerominek, 1993] or in other materials [Tsuda, 1991], exhibit some degree of hysteresis in their R(T) characteristic. This hysteresis, and the 1/f noise that frequently accompanies it, destroys all performance advantages associated with the very high TCR. A typical hysteresis loop width in thin film $VO_2$ is 5° C. Under special growth conditions, hysteresis widths as low as 1° C. have been reported [Kim, 1994 #132] in thin films, while in bulk (not thin film) form, single crystals can exhibit hysteresis widths as low as 0.15° C. [Kim, 1994].

Figure 2A:
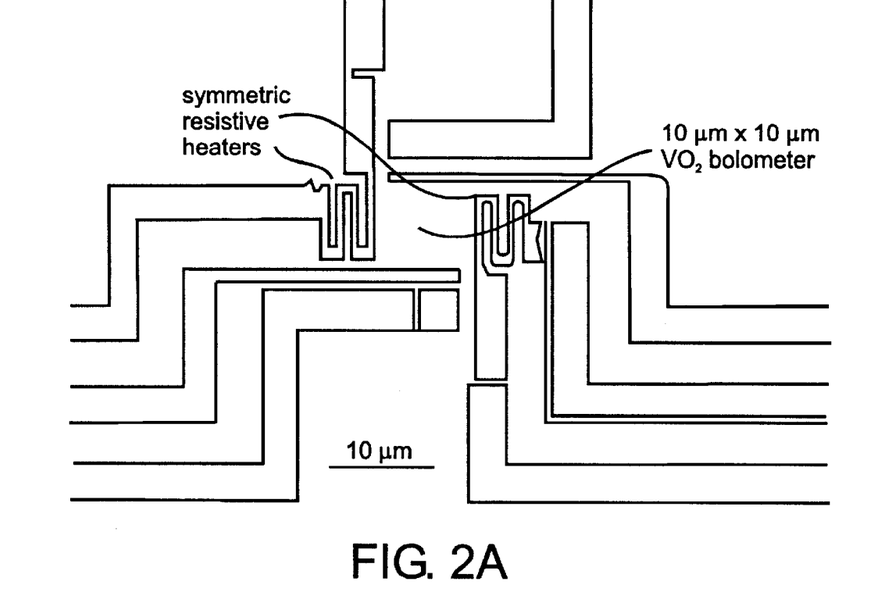
FIG. 2A shows a 10 $\mu$m×10 $\mu$m bolometer with symmetric resistive heating elements and independent V and I leads.
Figure 2B:
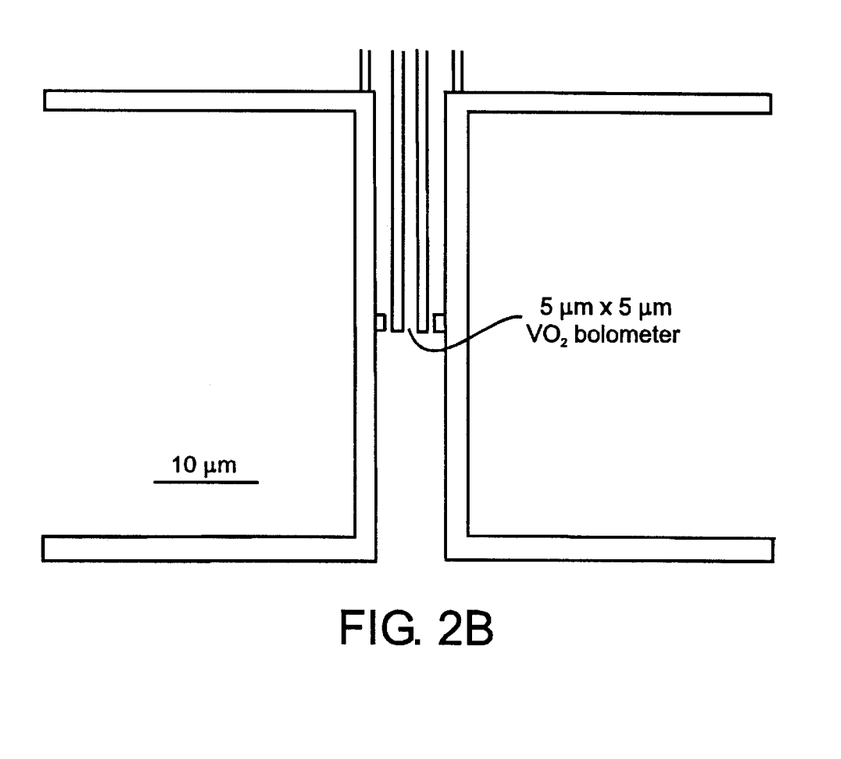
FIG. 2B shows a 5 $\mu$m×5 $\mu$m bolometer at the feed of a double dipole antenna structure resonant for 567 GHz radiation.

In previously described uncooled bolometers, the bias is applied either as a dc voltage or current [Jerominek, 1996] or as a short pulsed voltage [Wood, 1997]. In the case of a dc bias, the response to a small modulated IR signal is determined by the TCR of a "local" R(T) characteristic (see FIG. 2), i.e., the resistance changes resulting from small temperature excursions. This TCR within a local R(T) characteristic is typically no more than 8%, little better than in the semiconducting state. For the case of a short pulsed bias, the length of the pulse is too short for electrothermal feedback to be effective, and the full 1/f noise associated with the thin film in its transition is observed, again negating any advantage of the high TCR.

A technique called "correlated double sampling"(CDS) is commonly used for the readout of optical charge-coupled detectors (CCD's). In that case, the signal is given by the difference in voltage during a short "reset" period and a longer "data" period, while the present invention involves no such differencing. Furthermore, in the case of CDS for CCD readout, the bias during the data period is constant and the selection of critical bias and readout parameters is based on the detailed physics and design of the CCD, for example well capacity.

REFERENCES

1. DeNatale, J. F. et al., "Formation and characterization of grain-oriented $VO_2$ thin films," (1989) *J. Appl. Phys.* 66(12):5844.
2. Griffiths, C. H. and Eastwood, H. K., "Influence of stoichiometry on the metal-semiconductor transition in vanadium oxide," (1974) *J. Appl. Phys.* 45(5):2201.
3. Irwin, K. D. et al., "Thermal-response Time of Superconducting Transition-edge Microcalorimeters," (1998) *J. Appl. Phys.* 83(8):3978–3985.
4. Irwin, K. D., "Phonon-Mediated Particle Detection using Superconducting Tungsten Transition-edge Sensors," (1995), Ph.D. dissertation, Palo Alto, Calif.; Stanford Univ.
5. Jerominek, H. et al., "Micromachined, Uncooled, $VO_2$-based, IR Bolometer Arrays," (1996) *Proc. of SPIE* 2746:60–71.
6. Jerominek, H. et al., "Vanadium Oxide Films for Optical Switching and Detection," (1993) *Optical Eng.* 32(9):2092–2099.
7. Kim, D. H. and Kowk, H. S., "Pulsed Laser Deposition of $VO_2$ Thin Films," (1994) *Appl. Phys. Lett.*, 65(25):3188–3190.
8. Lee, A. T. et al., "A Superconducting Bolometer with Strong Electrothermal Feedback,"(1996) in UC Berkeley, Stanford, NIST Boulder; APL.
9. Morin, F. J., "Oxides which show a metal-to-insulator transition at the Neel temperature," (1959) *Phys. Rev. Lett.* 3(1):34.
10. Rogers, K. D. et al., "Characterization of epitaxially grown films of vanadium oxides," (1991) *J. Appl. Phys.* 70(3):1412.

11. Scott, R. S. and Fredericks, G. E., "Model for Infrared Detection by a Metal-Semiconductor Phase Transition," (1976) *Infrared Physics* 16:619–626.
12. Tsuda, N. et al., "Electronic Conduction in Oxides," (1991) Berlin: Springer-Verlag, p. 323.
13. Wood, R. A., "Use of Vanadium Oxide in Microbolometer Sensors," (1995) U.S. Pat. No. 5,450,053.
14. Wood, R. A., "Monolithic Silicon Microbolometer Arrays," (1997) in *Uncooled Infrared Imaging Arrays and Systems*, P. W. Kruse and D. D. Skatrud, Eds., Academic Press, San Diego, Calif., pp. 43–122.

All publications referred to herein are incorporated herein by reference to the extent not inconsistent herewith.

SUMMARY OF THE INVENTION

The purpose of the invention is to obtain improved performance from certain types of resistive bolometers. Bolometers are useful in the detection and measurement of infrared (IR) radiation and other forms of electromagnetic power. More specifically, the purpose of the invention is to allow operation of resistive bolometers on the sharp metal-semiconductor phase transition that exists in a number of uncooled bolometer materials, for example vanadium oxide. Ordinarily, such bolometers cannot be operated on their metal-semiconductor transition because the transition is hysteretic, i.e., it occurs at higher temperature when the device is heated through the transition than when it is cooled through the transition. See FIG. 1. As a result, the response to IR signal power is highly nonlinear, typically producing resistance changes that differ by two orders of magnitude for signal changes that are equal in magnitude but of opposite sign. In addition, the advantages in bandwidth, 1/f-noise suppression, and immunity to temperature fluctuations that accrue from operating on a sharp transition are lost when the transition is hysteretic. The purpose of this invention is to circumvent these deleterious effects of hysteresis.

In a preferred embodiment of the present invention, bias is applied across the bolometer material as an ac current, with a waveform that is specially selected to keep the microbolometer on only one branch, the cooling branch (also referred to herein as the freezing branch), of the R(T) characteristic at all times during the measurement of the device voltage. Periodic "reset" pulses occupy only an insignificant fraction of time. This ensures that the full temperature coefficient of resistance (TCR) of the transition is "visible" to the detector and bias circuit at all times, providing the full advantage of electrothermal feedback.

In the present invention, the bias during the data period must be montonically falling, while the detailed bias and readout parameters are selected by the criterion that the total power (bias power plus signal power) must be montonically decreasing.

The commercial applications of this bias and readout technique are numerous and large, and are best described by describing the current commercial applications of IR camera systems based on $VO_2$ microbolometers. These include: night vision systems for security and surveillance; search and rescue; firefighting and law enforcement; remote (non-contact) thermal imaging for manufacturing process control; rapid thermal processing of semiconductors; remote (non-contact) thermal imaging for failure recognition in machinery; non-destructive inspection and testing; pollution monitoring; and power distribution inspection.

The method for detecting a signal of this invention comprises:

a) providing a bolometer comprising a material having an abrupt hysteretic change in electrical resistance responsive to temperature change; said material being coupled to means for impinging said signal on said material;

b) applying an alternating current or change in voltage across said material in an amount and for a period of time sufficient to cause a temperature change resulting in initiation of said abrupt change in resistance; and c) detecting resultant change in electrical resistance of said material for a selected optimal duration at a selected optimal time after applying said alternating current or voltage, said resultant change in electrical resistance being indicative of the presence and strength of said signal.

A bolometer is essentially a sensitive thermometer comprising a material which responds to changes in temperature by producing changes in electrical resistance, and is used to detect and measure signals causing such changes in temperature such as radiation, especially infrared radiation, and electrical signals. Many materials are known to the art to have abrupt changes in electrical resistance, primarily materials used as semiconductors, which change from the semiconductor to metal phase at certain temperatures. The term "abrupt" with respect to the change in resistance as a function of temperature means that the material has a temperature coefficient of resistance (TCR) greater than about 8 to $10\%/°$ C. over the temperature range used. Preferably the material changes from semiconductor to metal phase over this temperature range. It is not necessary to cause a complete phase change; a change in temperature sufficient to cause only a partial phase change is often all that is required. Preferably the material has a TCR greater than about $100\%/°$ C., and more preferably greater than about $200\%/°$ C. over the temperature range used. The temperature range used is preferably above room temperature (about 30° C.), more preferably between room temperature and a temperature required for vacuum sealing the bolometer, i.e. about 100 to about 150° C. The temperature range over which the abrupt change in resistance occurs is preferably no more than about 5° C. A "hysteretic" change in electrical resistance means the abrupt change in resistance begins at a different temperature when the temperature is being raised than when the temperature is being lowered, as exemplified in FIG. 1.

A preferred bolometer material is a thin crystalline film of $VO_2$ grown on a sapphire substrate. Other semiconductor materials known to the art which change phase at temperatures close to room temperature are also preferred materials for use in this invention.

The bolometer is placed in the path of the signal to be detected and/or measured so that the signal causes a change in temperature of the material. An alternating current or change in voltage is applied across the material to give rise to a rate of change in temperature greater than that caused by the signal. The change in resistance is measured during a short time window selected to cover a short time period after applying the alternating current or voltage change when the change of resistance with respect to temperature is maximal and smooth. When alternating current is used with semiconductor materials, typically the cooling branch of the hysteresis loop will provide the optimal time window in which to measure resistance. The heating branch (also referred to herein as the melting branch) may provide an optimal time window under some conditions which may be empirically determined.

The alternating current or voltage change is applied so as to cyclically change the temperature of the material to give rise to the desired change in resistance. The change in resistance is measured repeatedly at the same point in the cycle and the data averaged. Preferably the data is processed to determine signal presence and strength and displayed and/or stored in electronic memory.

The alternating current or voltage change is preferably applied by means of electrodes placed on either side of the material, preferably by means of a programmable current bias source which is programmed to provide a desired current or voltage at a desired rate to produce a hysteretic loop or partial hysteretic loop during which the change in resistance may optimally be measured.

To calibrate the change in resistance in the bolometer material, preferably a set of resistive heaters is placed adjacent to the material to provide accurately-known signal power to the bolometer. Antennas may be used to direct the signal to be detected to the bolometer material. A gated integrator is preferably used to detect the signal.

BRIEF DESCRIPTION OF THE FIGURES

FIGS. 2A and B show a vanadium dioxide bolometer used to illustrate this invention.

FIG. 3 shows local R(T) characteristics for a 3 $\mu$m×3 $\mu$m bolometer. Three temperature profiles are shown, two which span the transition width and display closed hysteresis loops, and one which spans less than the transition width and results in an open hysteresis loop.

DETAILED DESCRIPTION

Figure 5:
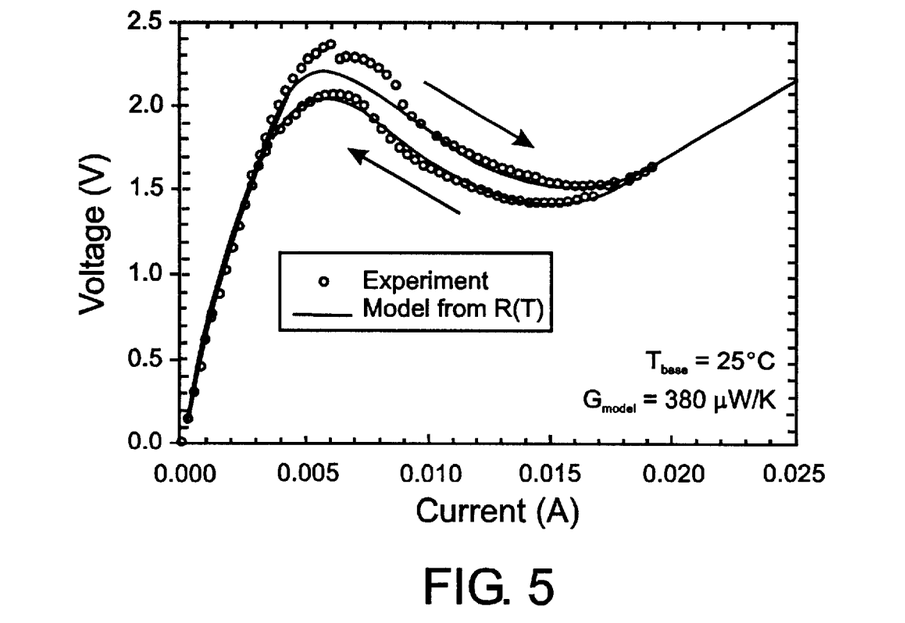
FIG. 5 shows experiment versus theory for a current-voltage (I-V) characteristic for a typical sample of thin film vanadium dioxide (with low contact resistance). The I-V curve, including hysteresis, is quite accurately predicted from the hysteretic R(T) curve using standard micrometer theory.

The problem created by hysteresis, which the present invention solves, is well illustrated in FIG. 5. Due to the hysteresis in the R(T) characteristic, the current-voltage (I-V) characteristic is also hysteretic. Indeed, using standard microbolometer theory [Wood 1997], the I-V curve can be predicted from the R(T) characteristic. The region of the metal-semiconductor transition is the region of negative differential resistance in the I-V curve. The conventionally used bias region is the semiconducting region, at lower biases than the peak.

The I-V curve shown in FIG. 5 is that for a constant (low) signal power. If the signal power were slightly increased, both the heating and cooling branches of the I-V curve would shift slightly downward. This shift represents the detection of the signal. However, because the signal power is small, there would still be a large gap between the heating curve with signal on and the cooling curve with signal off. That is, the temperature rise in the bolometer due to the signal is much smaller than the width of the hysteresis loop. Simply providing a dc bias current in the negative differential resistance region of the I-V curve will result in voltage responses to modulated signal power that are much smaller than indicated by the difference between the signal-on and signal-off I-V curves.

We have found experimentally that the cooling branch of the I-V curve is generally less noisy than the heating branch. We therefore show in FIG. 8 only the cooling branch of the I-V curve, and discuss in the following only operation on the cooling branch. However, it is conceivable that for other materials the relative noise in the two states could be different, in which case the bias and readout scheme we describe could be easily modified to reverse the roles of increasing and decreasing bias power. This should be considered an alternative embodiment of the invention.

This invention uses an ac bias to circumvent the hysteresis. The bias heats the sensor completely into the metallic state with each current pulse and then the voltage, which is highly sensitive to incident IR loading, is sampled upon cooling into the transition region. In this manner we recover the enhanced temperature sensitivity of the phase transition. Near the phase transition of crystalline $VO_2$ the resistance can drop more than four orders of magnitude in a temperature span of less than 5 ° C. The temperature coefficient of resistance for semiconducting vanadium oxides is typically reported to be $\alpha=1/R \cdot dR/dT=-2$ to $-6\%/°$ C. near room temperature. While this is substantially better than conventional metal or semi-metal (such as bismuth) bolometers which offer 0.2 to 0.4%/° C., a comparable parameter extraction from the midpoint of the transition of one of our $VO_2$ yields a value up to two orders of magnitude larger, 200%/° C. This figure of merit is key in extrapolating overall bolometer performance. In addition, the phase transition occurs at a convenient temperature (near room temperature) which lends itself well to biasing in negative electrothermal feedback.

When considering the behavior of a bolometer, the Joule heating of the sensor due to the bias must be accounted for. A bolometer under bias will equilibrate at an elevated temperature relative to its surroundings. This equilibrium operating point is reached when the Joule heating balances the heat loss to the surroundings. Electrothermal feedback (ETF) refers to the interaction between the bias and signal or noise power. ETF is a well known and proven phenomenon and is thoroughly documented in the literature [Wood, 1997, Irwin, 1995]. Conceptually, it is relatively simple to understand: if the bias is such that an upward thermal fluctuation, which is accompanied by a decrease in the sensor resistance (for negative α), causes a reduction in Joule heating at the sensor, then negative feedback occurs. Under negative ETF, the bias acts as a restoring force to return to thermal equilibrium. For a $VO_2$ sensor that has a large negative α, a current bias provides negative ETF. The strength of the feedback can be parameterized by the value β, which is effectively the open-lop gain of the feedback. β can be approximately expressed in physical terms relative to the sensor and self-bias conditions as $$\beta = \alpha \Delta T = \frac{(T - T_{base})}{R} \frac{dR}{dT}. \quad (1)$$

Hence high α in combination with a thermal self bias well above the base temperature results in strong negative ETF. α can also be extracted from a measurement of the V(I) characteristic of a sensor as $$\beta = \frac{Z - R}{Z + R}, Z = \frac{\partial v}{\partial I}, \quad (2)$$

which approaches a maximum as the differential resistance becomes equal and opposite to the dc device impedance. There are several significant advantages which result from strong negative ETF, the most important being 1/f and Johnson noise suppression. Speed enhancement and increased immunity to base temperature fluctuations also result. The main focus of this work was aimed at experimentally realizing both high sensitivity (increased α) from operating in the transition and strong negative ETF (high β) due additionally to self biasing in the transition (from room temperature). Table 1 summarizes these advantages in the extreme negative ETF limit and compares them to a device operated with negligible feedback.

TABLE 1

Extreme negative electrothermal feedback advantage
(I is the current bias, C the sensor heat capacity, and G the thermal conductance).

| Parameter | $\|\beta\| \ll 1$ | $\|\beta\| \gg 1$ |
|---|---|---|
| relative ETF | negligible | strong |
| responsivity (V/W) | $\frac{\beta}{I}$ | $\frac{1}{I}$ |
| τ(s) | $\tau_0 = \frac{C}{G}$ | $\tau_{eff} = \tau_0 \frac{1}{(1-\beta)}$ |
| $V_N$(v/Hz$^{1/2}$) (Johnson, 1/f) | $V_{N0}$ | $V_N = V_{N0} \frac{1}{(1-\beta)}$ |
| $\frac{dR/dT}{dR/dT_{base}}$ | 1 | $\frac{1}{\beta}$ |

Figure 9A:
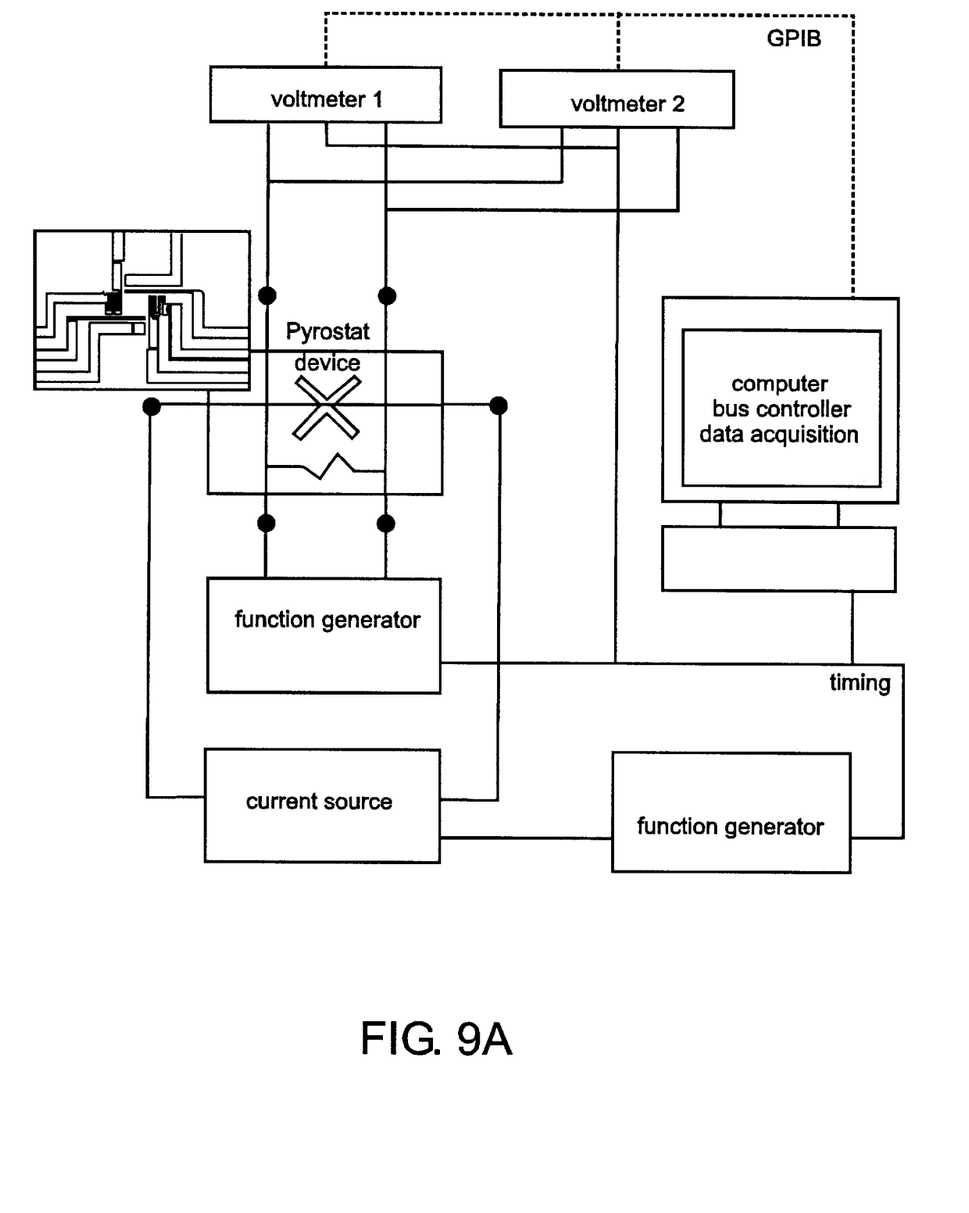
FIG. 9A shows a test system diagram for the laboratory setup for implementation and demonstration of the bias/readout technique of this invention using correlated double sampling (CDS) and electrical heat loading. The inset shows a thin-film vanadium dioxide microbolometer with resistive heaters.
Figure 9B:
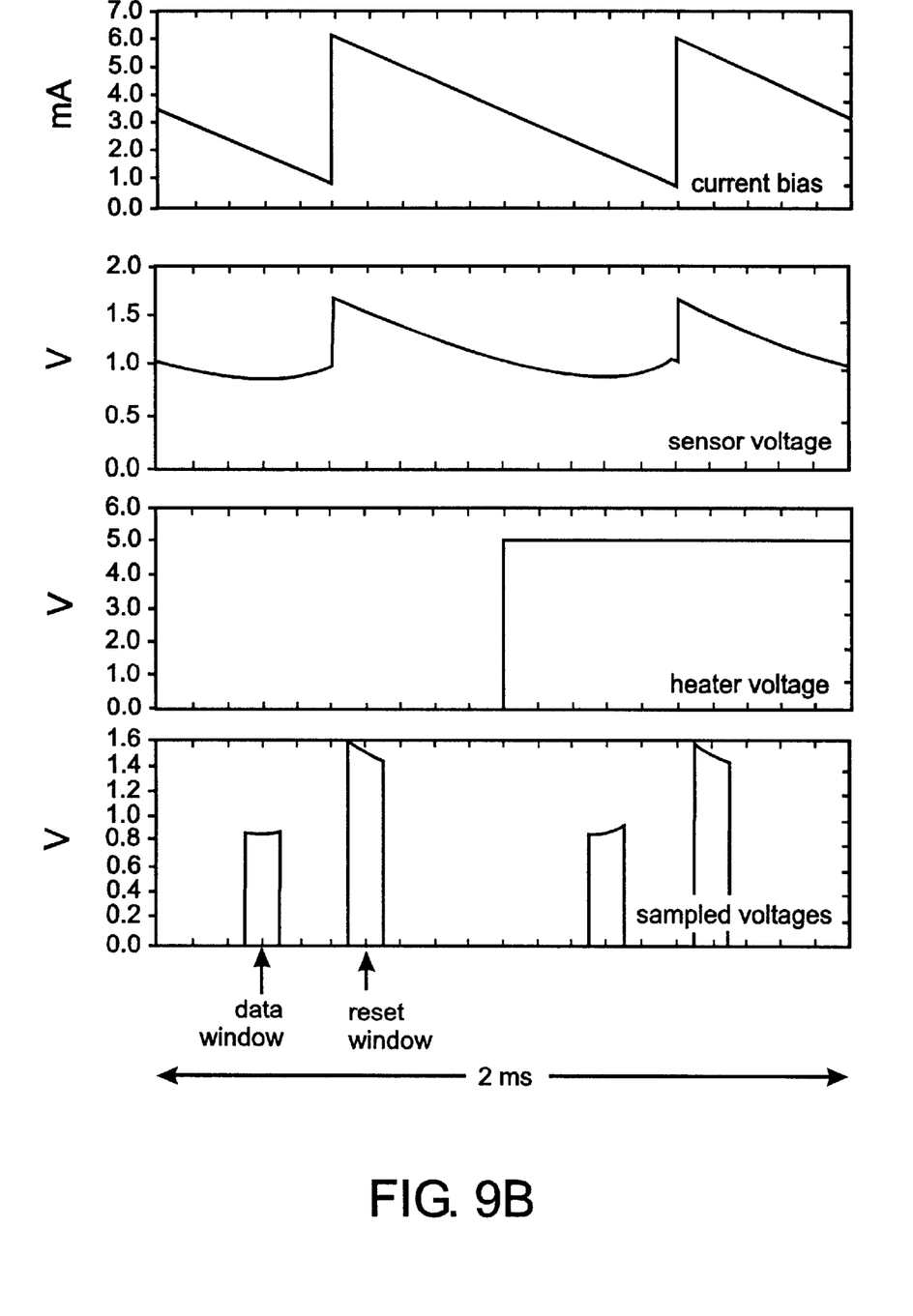
FIG. 9B shows a schematic of the relevant time domain signals of the bias and readout technique of this invention. In the case illustrated, the ac bias frequency is twice the signal frequency.

The basic technique for bias and readout of the hysteretic microbolometer is indicated schematically in FIG. 9B as a "timing diagram". In this simplest embodiment of the invention, the ac current waveform is a simple sawtooth, with a sharp rising edge and a peak value sufficient to bring the bolometer entirely into its metallic state. For all other times (i.e., except during this rising edge), the ac current is montonically decreasing. The sensitive period of the microbolometer is that during which the voltage is rising (i.e., on the negative differential resistance portion of the I-V curve). The data window over which the detector voltage is averaged covers this time period. Ideally, this window should cover the largest possible fraction of the overall period in order to optimize signal-to-noise ratio by averaging. Low frequency noise in the first stage amplifier or the bias circuit can be reduced by differencing the data value obtained with the voltage measured during the reset period of the waveform. This period can and should be much shorter than the data period because the detector noise is much lower during this period. The frequency of the ac bias should be faster than all signal frequencies of interest.

EXAMPLE

The main challenges associated with fabricating a useful high performance bolometric sensor included: optimizing film growth to yield sensors with high α, determining methods to pattern these films without degradation of their electrical properties, and mitigating the detrimental effects of high contact resistance between overlying metallization and the $VO_2$ films.

TABLE 2

Standard reactive sputtering film growth parameters

| Growth Parameter | Value |
|---|---|
| $T_{substrate}$ | 575° C. |
| $P_{total}$ | 1.00 Pa |
| $P_{O2}$ | 0.21 Pa |
| $P_{ar}$ | 0.79 Pa |
| DC magnetron power | 350 W |
| deposition rate | 90 nm/min |
| nominal deposition time | 2 min |
| nominal film thickness | 180 nm |
| substrate | sapphire ($Al_2O_3$), c-cut (0001) |

TABLE 3

Ion milling process parameters for patterning thin film $VO_2$

| Ion Mill Parameter | Value |
|---|---|
| mask | photoresist |
| Ar flow | 8 sccm |
| process pressure | $1.13 \times 10^{-2}$ Pa |
| beam voltage | 300 V |
| beam current | 20 mA |
| accelerator voltage | 300 V |
| probe current density | 0.50 mA/cm$^2$ |
| sample stage | rotating, water cooled |
| $VO_2$ mill rate | ≈8 nm/min |

Crystalline thin films of various phases of $V_xO_y$ have been grown by a variety of methods including reactive sputtering, reactive electron beam evaporation, MOCVD, and pulsed laser deposition. After considering issues such as facilitation, ease, and expense we settled on reactive sputtering as a means of film growth. We adopted initial conditions based on those reported in the literature, [Griffiths, 1974, DeNatale, 1989, Rogers, 1991] and then proceeded to optimize the film deposition to achieve high quality thin films of $VO_2$ on crystalline sapphire substrates. Ultimately, the process conditions listed in Table 2 were settled on. This process consistently yielded high quality thin films of phase pure, crystalline $VO_2$. The R(T) characteristic of a typical (patterned) sample is shown in FIG. 1. Samples grown under these conditions typically displayed critical temperatures ($T_c$) near 70° C., hysteresis widths ($T_{c,melt} - T_{c,freeze}$) of about 5° C., and resistance ratios ($R_{60° C.}/R_{80° C.}$) in excess of $10^4$.

To pattern the thin films into useful test structures, we used a combination of conventional optical lithography, argon ion milling, and lift off metallization. The detailed parameters for the milling step are listed in Table 3. To reduce contact resistance and promote metal adhesion, the metallization was often preceded by a surface treatment in the contact areas. This treatment involved varying degrees of ion bombardment in the contact areas, both in-situ and ex-situ with respect to the metal deposition. The idea was to effectively create degenerately doped regions in the contacts (through liberation of bound O in the film). Dependent on ion energy and dosage, reduction of contact resistance was observed, but it was often accompanied by degradation of the R(T) characteristics of the film, presumably due to ion-induced damage of the film.

The devices we designed, fabricated and evaluated included three types of structures: sensors of varying geometry with and without resistive heaters in proximity, antenna-coupled microbolometers for optical response measurements, and Van der Pauw structures for measuring specific contact resistance between $VO_2$ and Au. Examples of two of these structures are included as FIGS. 2A and 2B.

The first class of structures included variable sized sensors of $VO_2$ material spanning the range from 1 $\mu$m×1 $\mu$m to 300 $\mu$m×300 $\mu$m, some with symmetric resistive heating elements as in FIG. 2A. These structures were used primarily for evaluating R(T), V(I), noise, and electrical responsivity. The original goal of this project was to make sensors compatible with a submillimeter wave telecommunication transceiver. To this end, it was necessary to demonstrate quasi-optical coupling of 584 GHz radiation into antenna coupled microbolometers. The device of FIG. 2B is such a structure. It is composed of a small (5 $\mu$m ×5 $\mu$m) $VO_2$ microbolometer at the feed of a 567 GHz resonant double dipole antenna. Radiation from a gas-molecular laser was coupled into this structure through the sapphire substrate by illuminating a hyperhemispherical quartz substrate lens mounted on the backside of the sensor substrate. Van der Pauw structures allowed for simple measurements of the contact resistance between the $VO_2$ and metal films. Various surface treatments and their effect on $\rho_C$ were investigated using these structures. As a final note, all of our test structures were fabricated directly on the sapphire substrate; no effort was made to engineer special thermal isolation structures to enhance performance.

Resistance versus temperature characterizations were routinely undertaken on samples to measure the critical temperature, width, and the hysteresis of the phase transition. There was very little variation observed between samples processed in an identical manner. The critical temperatures (defined as the temperature where the sample is at the midpoint in resistance) were observed to fall in the range of 70–73° C. on the melting branch of the transition and between 65–68° C. on the freezing branch. Outside the transition, semiconducting behavior (conductance $\propto \epsilon^{-\Delta T/\kappa T}$) was observed at temperatures below the transition and metallic behavior ($\alpha$>0) was universally observed for temperatures >80° C. The temperature coefficient of resistance in the semiconducting state was typically in the range of –2 to –6%/° C. Resistivity in the semiconducting state at room temperature was consistently in the range of 10–20 $\Omega\cdot$cm and dropped to 0.1–1.0 m$\Omega\cdot$cm in the metallic state. All of these properties are plainly displayed in the R(T) of FIG. 1.

Figure 3:
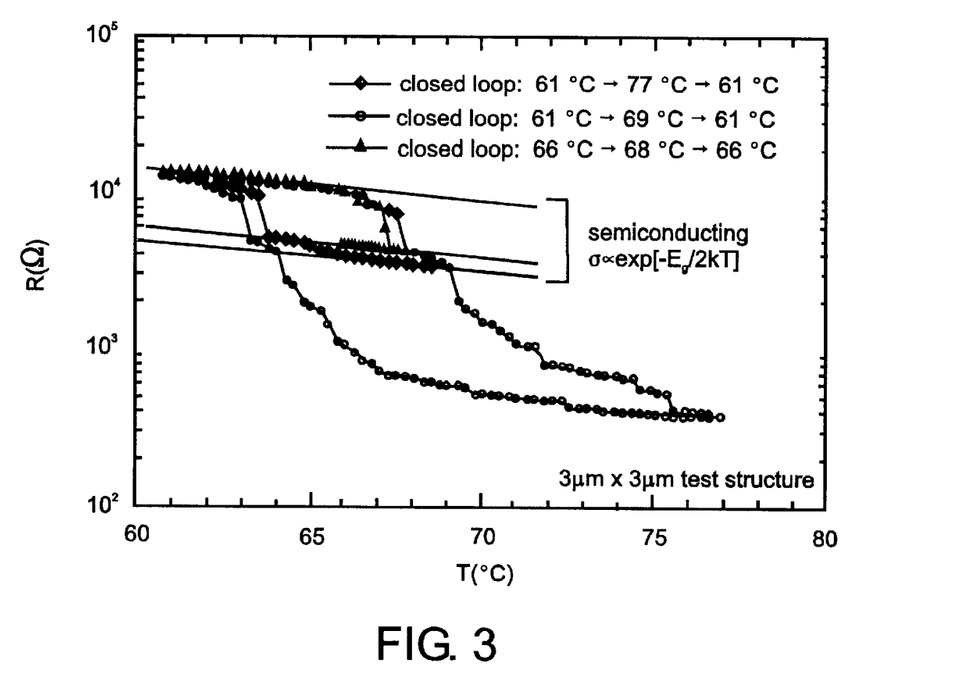

Since the main focus of this work was to use sensors biased on the phase transition, significant effort went into evaluation of the transition. FIG. 3 shows three high resolution thermal cycles about and within the phase transition for a 3 $\mu$m×3 $\mu$m bolometer structure. If a thermal cycle with an excursion greater than the hysteresis width is executed, then the hysteresis loop is closed: the device returns to the original resistance upon cooling. There are two loops in the figure that meet this criterion. If the excursion is less than the transition width a different situation arises. As in the other cases, when the sample is melted, large, continuous and sometimes discrete reductions in resistance are observed. However, upon freezing, the resistance does not return to the original value; instead it follows a trend consistent with the semiconducting behavior observed below the transition. The main implication of this behavior is that if the sample is dc biased within the transition, the full sensitivity of the transition is not realized: thermal events which cause heating follow the steep melting branch of the R(T) curve but cooling events see only the reduced semiconducting response of the sensor (low $\alpha$). The reason for using an ac bias is to circumvent this restriction.

To maximize the potential benefits of operating in the strong ETF regime, two conditions need to be met: a current bias is required, and the temperature to which the bias self heats the sensor should be as far from the base temperature as practical. For driving a $VO_2$ bolometer this implies the need for a stiff current source with large voltage compliance (so as to act as a current source over the complete range of resistance for the sensor from room temperature to the operating point, $10-10^5$ $\Omega$). For most measurements we used a custom current source based on a high voltage operational amplifier which was driven and controlled by a standard signal generator.

Figure 4:
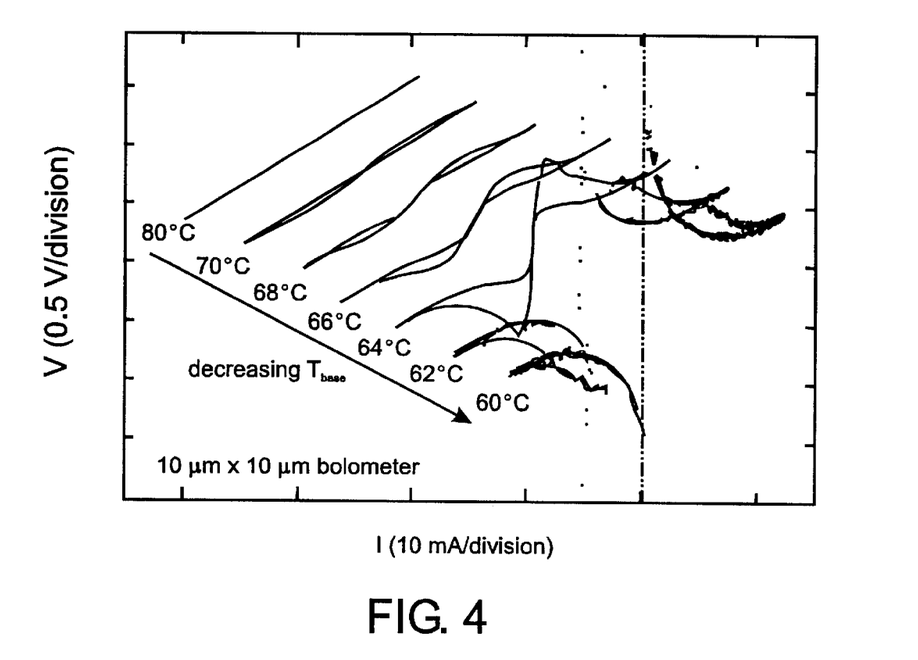
FIG. 4 shows evolution of V(I) characteristic as the base temperature of the bolometer material is lowered. For clarity, each successive V(I) is offset in I and V. An increase in the zero bias resistance (slope at the center of the span, the onset of hysteresis, and the well-defined region of negative differential resistance as the base temperature is lowered are evident.

This issue becomes more apparent upon examination of FIG. 4 which shows the evolution of V(I) as the base temperature is lowered. At the upper left, for a base temperature of 80° C., the entire sensor is above the transition and in the metallic state. As a result, the device appears entirely resistive (R=100 $\Omega$). As the base temperature is lowered, two features begin to evolve: a region of increased resistance about the original and appearance of hysteresis in V(I). The higher resistance is simply the increased resistance at the lower base temperature. The hysteresis is a reflection of the hysteretic R(T) characteristics of the sensor. At the lowest base temperature represented in FIG. 4 (60° C.), the high resistance of the sample in the semiconducting state is clearly evident as the nearly vertical portion of the V(I). Also apparent is a well-defined region of negative differential resistance (Z<0) on the freezing (lower) branch of the V(I) curve. Recalling equation (2), which related the V(I) to the ETF parameter $\beta$, the bias should be selected at the point near where Z approaches -R on the freezing branch for maximum $\beta$.

The analogy between the R(T) and V(I) is readily understood using classical bolometer theory. A computer model was developed to compute V(I) from a standard measured R(T) curve. The theory was somewhat limited in applicability due to two fundamental assumptions in the model: no parasitic Joule heating near the sensor and isothermality across the sensor. The first assumption was the more stringent. Simply stated, this assumption implies that all of the heating at the sensor comes from the self-heating due to the bias, P–V*I. The unavoidable parasitic contact resistance rendered this assumption false for most cases; heating at the contacts affected V(I) in a manner not accounted for in the model. The second assumption, while not ideal, did not appear to significantly affect the applicability of the model for certain samples. FIG. 5 shows V(I), experiment, and theory, for a low resistance sensor with negligibly small contact resistance. The model provides for very good agreement between the V(I) curves for this device.

Figure 6:
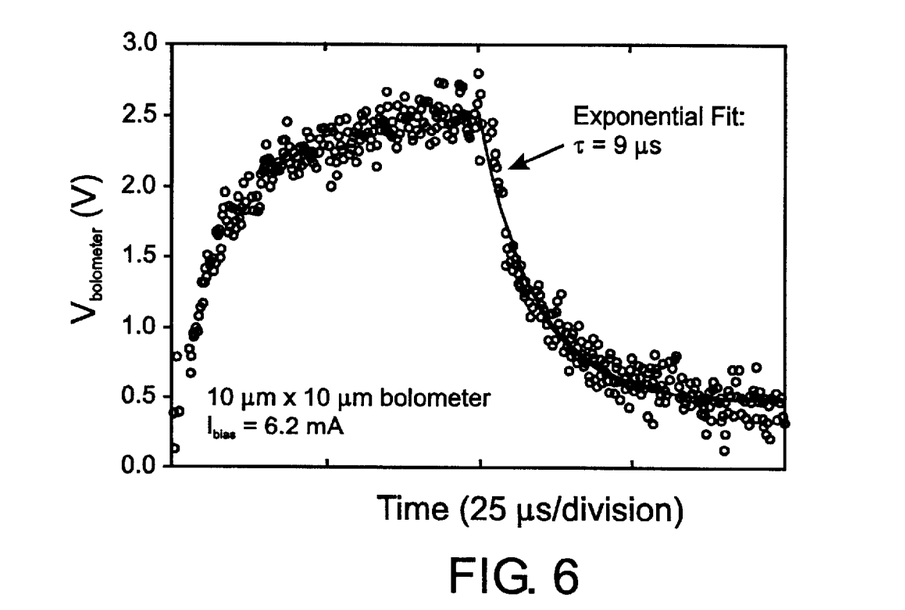
FIG. 6 shows bolometer response to electrical heat pulse and extraction of the thermal time constant.

The measurement of the time constant (for the same sensor as in FIG. 5) was made by applying a heat pulse to an adjacent heating element and monitoring the response of the sensor. FIG. 6 shows such a measurement. An exponential fit to the data provides a measure of the time constant of $\tau=9$ $\mu$s. This time constant measurement was made at a dc bias near the foot (R-330 $\Omega$) of the phase transition. The bias point was on the freezing branch (approached from higher temperature by reducing the bias) near=0 (the local maximum on lower branch of FIG. 5).

For a conventional bolometer without electrothermal feedback, the response time is simply $\tau_o=C/G$, where C and G are the heat capacity and thermal conductance of the bolometer. Under dc bias, our bolometers should display a response time close to this value, since the feedback is weak in that case. Because our bolometers have no special thermal isolation structure, the heat capacity is dominated by the volume of substrate material immediately beneath the bolometer; it can be roughly estimated by calculating the heat capacity of a hemisphere of sapphire whose cross-sectional area equals that of the bolometer. For a 10 $\mu$m×10 $\mu$m bolometer, this yields C=1.2 nJ/K. Combining this with the measured thermal conductance (extracted from the V(I) curve) of 380 $\mu$W/K yields $\tau_o=3.0$ $\mu$s. On the other hand, there is another component to the time constant which arises because the $VO_2$ phase transition is first order, with a latent heat that has been measured to be L=223 $J/cm^3$. This adds an effective heat capacity of $C_{eff}=L/\Delta T$ (where $\Delta T$ is the width of the transition) to the ordinary heat capacity. For a film volume of 10 $\mu$m×10 $\mu$m×0.15 $\mu$m and a transition width of 3 K, this implies an additional heat capacity of 1.1 nJ/K, which is (coincidentally) equal to the ordinary component of heat capacity, within the accuracy of the estimates. The expected total capacity is thus approximately 2.3 nJ/K, and the expected time constant is approximately 6.0 $\mu$s. The agreement with our measured time constant of 9.0 $\mu$s is quite satisfactory, given the accuracy of the heat capacity estimate.

Figure 7:
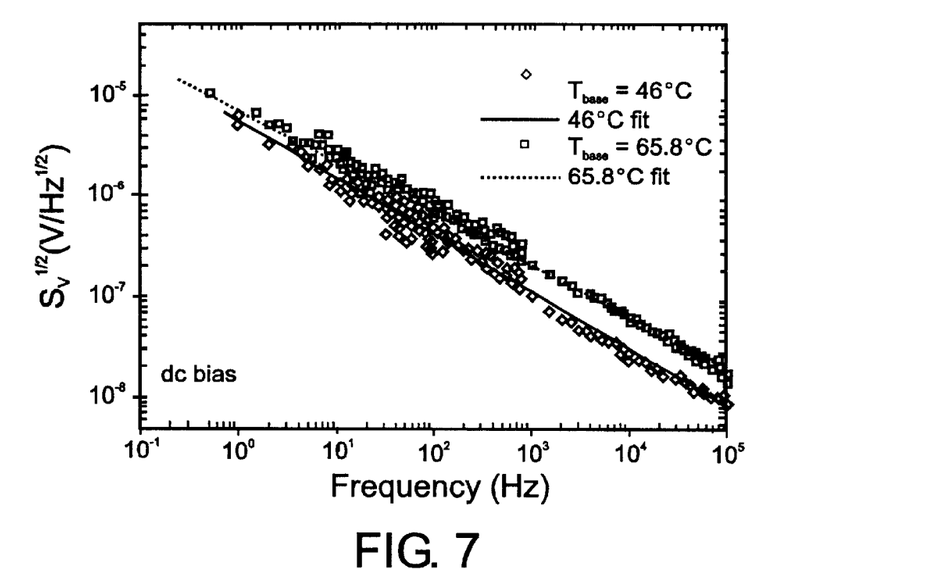
FIG. 7 shows voltage noise of a dc-biased bolometer for moderate ($T_{base}$=46° C.) versus weak ($T_{base}$=65.8° C.) electrothermal feedback.

Voltage noise measurements were made on a variety of devices with differing dc biases. In all cases the bias points were on the freezing branch and approached in the same way as above. The results indicate that for our samples the voltage noise is dominated by 1/f noise at low frequencies. An experiment using dc bias at different thermal bias points was undertaken to evaluate the effect of an ETF bias on the noise properties of the sample. FIG. 7 shows the result of this test. The plot shows two noise spectra, one for a base temperature approximately 20° C. above room temperature (45° C.) and the second for a base temperature in the transition (65.8° C.). These two cases correspond to moderate (large $T-T_{base}$) and weak ETF (small $T-T_{base}$). What was observed was a reduction in voltage noise (V/$\sqrt{Hz}$) of −3 dB for the case of higher β. This can be understood considering the hysteresis of the transition and the projections of Table 1: since strong ETF applies only to fluctuations in one direction (high α for melting fluctuations, semiconducting α for freezing fluctuations), only half of the noise is suppressed. This is a direct result of ETF and suggests larger potential noise suppression if a higher effective α can be achieved (circumvent hysteresis through ac biasing schemes). Noise data collected from samples of varying size showed proper volume scaling, $S_v$ Volume$^{-1}$, over the size range investigated, 3 $\mu$m×3 $\mu$m to 100 $\mu$m×100 $\mu$m. We also observed the expected bias scaling for resistance fluctuations, $S_R^{1/2}$ R, over the resistance range of 200 $\Omega$ to 3 k$\Omega$.

To utilize the hysteretic phase transition, we developed an ac bias scheme which allows for sampling the sensor as it is cooled through the phase transition. We refer to this as correlated double sampling (CDS) due to its similarity to read out methods used in CCD arrays. The idea is to apply an ac bias which resets the sensor by heating it fully above the phase transition once each period and then sampling the voltage of the device in the most sensitive region of the V(I) curve as it cools through the transition.

Figure 8:
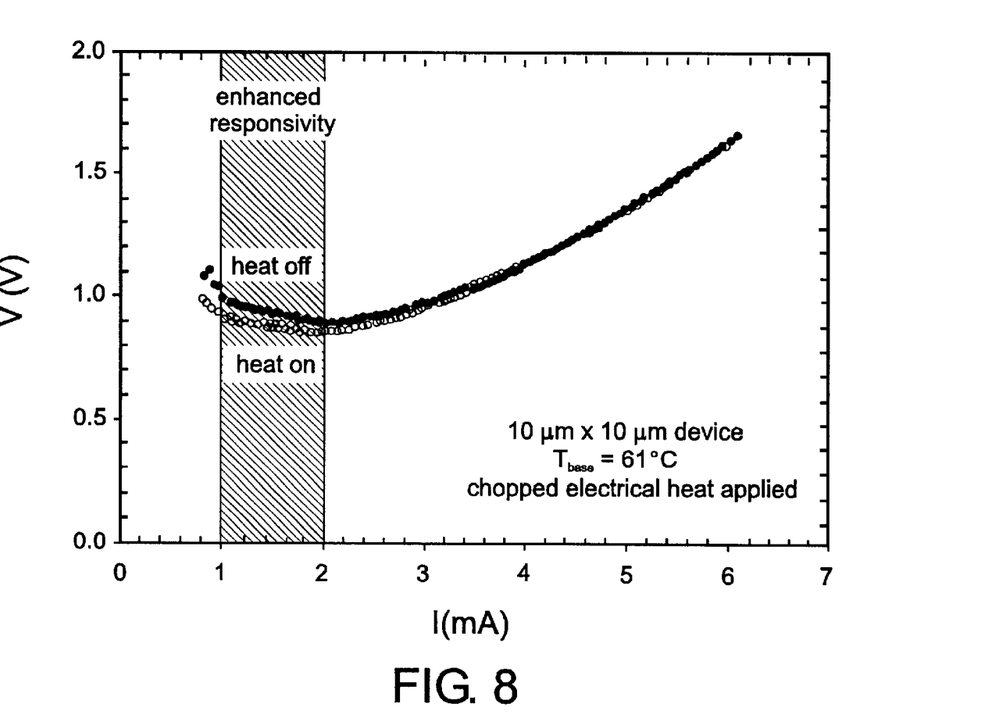
FIG. 8 shows local V(I) curve under pulsed electrical heat loading (only the cooling branches are shown) for signal power on and off.

FIG. 8 shows the freezing branch of a V(I) curve with and without an external signal (heat pulse into adjacent resistive heater). The offset between the two curves is the signal of interest.

FIG. 9A shows a laboratory setup that has been used to demonstrate and reduce to practice the bias/readout technique. It was assembled from a number of general laboratory instruments together with a custom designed chip mount ("pyrostat") and custom written software to drive the general purpose data acquisition system. The chip mount is not essential to the operation of the bias and readout technique; indeed one of the advantages obtained by use of electrothermal feedback on the metal-semiconductor transition is that device performance is highly immune to ambient temperature drifts. In a commercial version, the functions performed by the general laboratory instruments, i.e, bias waveform generation and data acquisition, could be performed by an application-specific integrated circuit (ASIC).

FIG. 9B shows the relevant signals in the time domain. The current drive is a sawtooth whose amplitude and offset is such that at the peak current level the device is self-heated fully into the metallic state and as the current is ramped down, the device cools into the transition. The sensor voltage and heater (signal) voltage are plotted below this. For this proof-of-principle experiment the heater signal was driven at half the current bias frequency so as to cause the sensor to alternately follow the branches of FIG. 8. The lowest timing plot shows the sampling windows during which the sensor voltage is integrated. The windows are referred to as the data and reset windows. During the data window, the sensor is in the transition and the voltage is strongly dependent on the heat loading (optical or electrical). During the reset window, the sensor is metallic and the voltage is (nearly) independent of the heat loading. The signal of interest is then the difference between these two voltage levels.

Figure 10A:
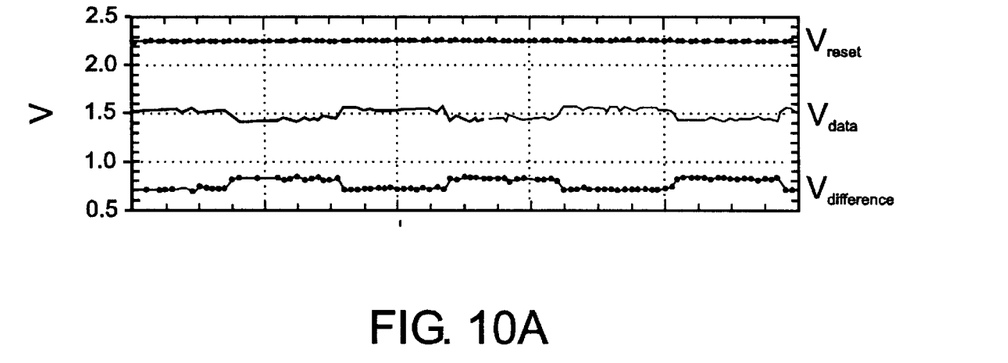
FIGS. 10A and 10B show the reset voltage, data voltage and the difference as functions of time.
Figure 10B:
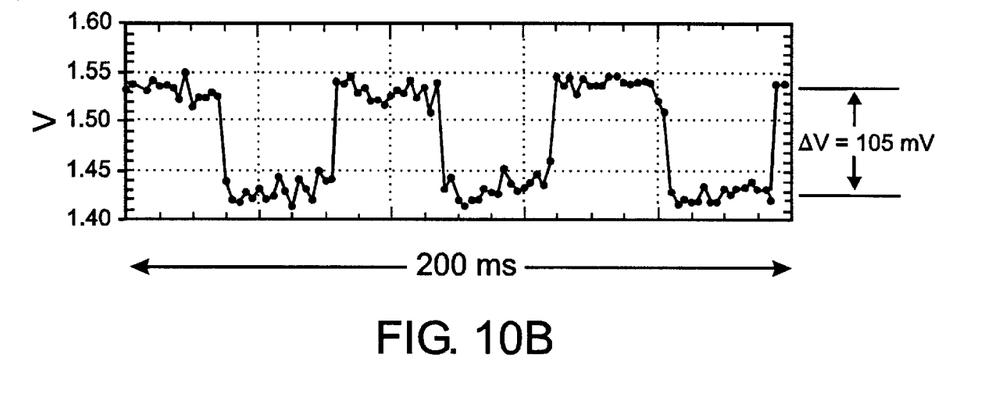

Test data taken with this laboratory demonstration are shown in FIG. 10 using a resistive heater to provide the signal power. (These heaters are visible in the inset to FIG. 9A, which shows a photograph of a complete test microbolometer.)

FIG. 10 shows the reset voltage, the data voltage, and the difference as functions of time. The lower plot is an enlargement of the difference signal. For the data of FIG. 10, the heat pulse frequency was 15 times lower than the bias frequency, hence the difference level changed once for every 15 samples.

The most important conclusion from FIG. 10 concerns the responsivity enhancement observed using the CDS bias technique. The measured responsivity using the ac bias technique was 108 V/W. A direct comparison with data taken under the same conditions only at dc current bias shows an improvement of a factor of 5 using ac bias and CDS. A few comments are in order regarding this result. These data were taken in a region of only modest ETF. The value of β, extracted directly from the V(I) within the data window, was only −1.36. If we extrapolate an α from this value we find α=0.27 $K^{-1}$. We can attribute the responsivity gain to the increased α from operating in the transition ($T-T_{base}$=5 C).

If we were able to invoke strong ETF by further increasing β (increase α or decrease $T_{base}$), the responsivity would approach the limit of 1/I, which for the case of FIG. 10 is 500 V/W. Beyond the responsivity saturation point, increasing the ETF would continue to suppress Johnson and 1/f noise. In some situations this could lead to an enhanced signal-to-noise ratio (SNR) over a broadened bandwidth.

The above experiment was non-optimal with respect to maximizing β for the highest possible performance enhancement ($T_{base}$=30 C and $Z_{bias}$=−R, see Table 1), and more consideration needs to be aimed towards optimizing the bias with respect to waveform shape, amplitude, and frequency. Under optimal conditions, significant improvement, comparable with the predictions of Table 1 and β=100–200, should be observed in single pixels.

Alternative embodiments of the invention include use of the heating branch of the I-V curve instead of the cooling branch for the sensitive "data" period (discussed above), and more complex ac current bias waveforms than the simple sawtooth described above that preserve the essential features described above. These are: peak value of current bias sufficient to bring the microbolometer entirely into metallic state, given by the equation $I_{max}=[G(T_m-T_{base})/R_m]^{1/2}$, with $R_m$ and $T_m$ lying where the two branches of R(T) meet on the high side; minimum value of current where device resistance becomes too high for other reasons, i.e., poor match to antenna or current supply isn't sufficiently stiff, or granularity effects are too strong, whichever comes first, i.e., $I=[G(T_o-T_{base})/R_{max}]^{1/2}$, where $T_o$ and $R_{max}$ lie on the cooling branch of the R(T) characteristic; slew rate in total power (bias plus signal) is always negative during data period; and frequency of the ac bias current faster than all signal frequencies of interest.

The described bias and readout technique allows operation on the metal-semiconductor transition with the concomitant advantages of higher speed, lower noise, and greater immunity to ambient temperature fluctuations. It is most applicable to applications which require high speed and low noise, but which can accept a smaller array format than present arrays which are typically 240×320 pixels.

It will be readily understood by those skilled in the art that the foregoing description has been for purposes of illustration only and that a number of changes may be made without departing from the scope of the invention. For example, other bolometer materials than those mentioned may be used, other signals may be detected, other temperatures and phase changes may also be used. Temperatures below room temperature may also be used in cooled systems. In addition, equivalent structures to those described herein for a bias and readout system following the principles of this invention may be readily devised without undue experimentation by those skilled in the art.

What is claimed is:

1. A method for detecting a signal comprising:
    a) providing a bolometer comprising a material having an abrupt hysteretic change in electrical resistance responsive to temperature change; said material being coupled to means for impinging said signal on said material;
    b) applying an alternating current or chance in voltage across said material in an amount and for a period of time sufficient to cause a temperature change resulting in initiation of said abrupt change in resistance; and c) detecting a resultant change in electrical resistance of said material for a selected optimal duration at a selected optimal time after applying said alternating current or voltage, said resultant change in electrical resistance being indicative of the presence and strength of said signal.

2. The method of claim 1 wherein said signal is caused by radiation impinging on said material.

3. The method of claim 1 wherein said signal is caused by electrical energy impinging on said material.

4. The method of claim 1 wherein said signal is caused by infrared radiation impinging on said material.

5. The method of claim 1 wherein said material is a semiconductor material and said abrupt hysteretic change is a change from metal phase to semiconductor phase.

6. The method of claim 1 wherein said material is a thin crystalline film of $VO_2$.

7. The method of claim 1 wherein an alternating current is applied.

8. The method of claim 1 wherein a change in voltage is applied to said material.

9. The method of claim 1 wherein said alternating current or change in voltage is applied so as to give rise to a rate of change in temperature greater than that caused by the signal.

10. The method of claim 1 wherein said resultant electrical resistance is detected during a cooling branch of said hysteresis.

11. The method of claim 1 wherein said resultant electrical resistance is detected during a heating branch of said hysteresis.

12. The method of claim 1 wherein said temperature change occurs between about 30° C. and about 150° C.

13. The method of claim 1 wherein said temperature change occurs between about 30° C. and about 100° C.

14. A bolometer for detecting a signal comprising:
    a) a material having an abrupt hysteretic change in electrical resistance responsive to temperature change;
    b) means for applying an alternating current or change in voltage across said material in an amount and for a period of time sufficient to cause a temperature change resulting in initiation of said abrupt change in resistance;
    c) means for detecting a resultant electrical resistance of said material for a selected optimal duration at a selected optimal time after applying said alternating current or voltage, said resultant electrical resistance being indicative of the presence and strength of said signal; and
    d) a display for displaying detected resultant electrical resistance.

15. The bolometer of claim 14 having length and width dimensions independently between about 1 μm and about 300 μm.

16. The bolometer of claim 14 wherein said material is a thick crystalline film of $VO_2$.

17. The bolometer of claim 16 wherein said film is grown on a crystalline sapphire substrate.

18. The bolometer of claim 14 having a temperature coefficient of resistance of at least about 200%/° C.

19. The bolometer of claim 14 wherein said means for applying alternating current or voltage comprise a programmable current bias source.

20. The bolometer of claim 14 wherein said means for detecting resultant electrical resistance comprises a gated integrator.

* * * * *